US012728730B2

(12) United States Patent
Gorney et al.

(10) Patent No.: US 12,728,730 B2
(45) Date of Patent: Sep. 8, 2026

(54) VEHICLE CONTROL IN A REDUCED POWER MODE

(71) Applicant: FCA US LLC, Auburn Hills, MI (US)

(72) Inventors: Anthony N Gorney, Oxford, MI (US); Stephanie R Beck, Pinckney, MI (US)

(73) Assignee: FCA US LLC, Auburn Hills, MI (US)

( * ) Notice: Subject to any disclaimer, the term of this patent is extended or adjusted under 35 U.S.C. 154(b) by 256 days.

(21) Appl. No.: 18/537,914

(22) Filed: Dec. 13, 2023

(65) Prior Publication Data

US 2025/0196661 A1 Jun. 19, 2025

(51) Int. Cl.
*B60L 15/20* (2006.01)

(52) U.S. Cl.
CPC ....... *B60L 15/2045* (2013.01); *B60L 2240/12* (2013.01); *B60L 2240/64* (2013.01); *B60L 2240/68* (2013.01)

(58) Field of Classification Search
CPC ............. B60L 15/2045; B60L 2240/12; B60L 2240/64; B60L 2240/68
USPC ............................................................ 701/22
See application file for complete search history.

(56) References Cited

U.S. PATENT DOCUMENTS 5,432,413 A * 7/1995 Duke .................... B60W 10/08 180/65.245
9,081,651 B2 * 7/2015 Filev .................. G01C 21/3469
10,415,986 B2 * 9/2019 Meyer .................... G01C 21/26
10,821,849 B2 * 11/2020 Koebler ................. B60K 35/60
10,821,851 B2 * 11/2020 Koebler ............. G01C 21/3617
10,890,459 B2 * 1/2021 Matsumura ........ G01C 21/3484
2009/0259354 A1 * 10/2009 Krupadanam ......... B60W 10/11 701/93
2011/0246004 A1 * 10/2011 Mineta ................... B60W 20/11 903/903
2011/0313647 A1 * 12/2011 Koebler ................. B60K 35/80 701/123
2013/0151046 A1 * 6/2013 Choi ................ G08G 1/096827 903/902
2014/0277835 A1 * 9/2014 Filev .................. G01C 21/3469 701/2
2018/0065485 A1 * 3/2018 Koebler .................... B60T 7/18
2018/0118029 A1 * 5/2018 Koebler ............. G01C 21/3617
2018/0173219 A1 * 6/2018 Lee .................... G01C 21/3492
2018/0238698 A1 * 8/2018 Pedersen ............ G01C 21/3492
2019/0120640 A1 * 4/2019 Ho ..................... G01C 21/3453
2019/0283593 A1 * 9/2019 Koebler .................. B60L 58/12
2020/0062126 A1 * 2/2020 Duan ...................... B60L 58/25
2022/0242239 A1 * 8/2022 Koebler .................. B60L 8/003
2022/0306152 A1 * 9/2022 Zhang ............... B60W 60/0017
2023/0059421 A1 * 2/2023 Dadkhah Tehrani ........................ G05D 1/0055

* cited by examiner

*Primary Examiner* — Luis A Martinez Borrero
(74) *Attorney, Agent, or Firm* — Jeremy J. Klobucar

(57) ABSTRACT

In at least some implementations, a method includes determining that a vehicle is operating in a reduced power mode, determining a destination of the vehicle, determining more than one route to the destination, determining one or more energy thresholds for each route, selecting one of the routes as a chosen route, and guiding the vehicle along the chosen route. The chose route may be selected based on the one or more energy thresholds and as a function of the energy output available from the vehicle.

18 Claims, 2 Drawing Sheets

VEHICLE CONTROL IN A REDUCED POWER MODE

FIELD

The present disclosure relates to control of a vehicle that is operating in a reduced power mode.

BACKGROUND

Vehicles include a complex network of sensors and controllers that monitor and control aspects of operation of an engine or motor that propels the vehicle. Certain faults in the sensors, control system or the engine or motor result in the vehicle operating in lower power output mode sometimes called "limp" mode. In this mode, the vehicle has less power output and may have a lower maximum achievable speed and has less ability to climb hills.

SUMMARY

In at least some implementations, a method includes determining that a vehicle is operating in a reduced power mode, determining a destination of the vehicle, determining more than one route to the destination, determining one or more energy thresholds for each route, selecting one of the routes as a chosen route, and guiding the vehicle along the chosen route. The chose route may be selected based on the one or more energy thresholds and as a function of the energy output available from the vehicle.

In at least some implementations, the one or more energy thresholds is a maximum power required for the vehicle to navigate any portion of each route. In at least some implementations, the maximum power is determined as a function of at least: a) a road grade for a road within each route, and b) a speed limit of the road. In at least some implementations, the maximum power is determined at a level equal to or within 10% or 5 mph to 10 mph of the speed limit. In at least some implementations, the road has a minimum speed requirement and the maximum power is determined at a level equal to the minimum speed requirement.

In at least some implementations, the one or more energy thresholds is a total energy required for the vehicle to travel each route, and the total energy is compared to a vehicle range that is determined as a function of the energy available to propel the vehicle.

In at least some implementations, guiding the vehicle is accomplished with a vehicle control system that controls steering, throttle and braking of the vehicle.

In at least some implementations, the reduced power mode results in the vehicle having less available torque from a prime mover of the vehicle, and the step of selecting one of the routes is accomplished as a function of the available torque.

In at least some implementations, the reduced power mode results in the vehicle having a reduced maximum speed, and the step of selecting one of the routes is accomplished as a function of the reduced maximum speed. In at least some implementations, the reduced maximum speed is compared to a speed limit of each road along each route, and the step of selecting one of the routes is accomplished as a function of the maximum differential between reduced maximum speed and a highest speed limit in each route.

In at least some implementations, the chosen route is selected as a function of one or more of regulatory information, terrain information and current information.

In at least some implementations, the regulatory information includes one or more of a road speed limit, traffic rules, permitted direction(s) of travel, locations of intersections, and number of stops along a road.

In at least some implementations, the terrain information includes one or more of a road grade, and a type of road surface.

In at least some implementations, the current information includes one or more of a presence of construction, a lane closure, a traffic level, where the traffic level may be one or both of a current or predicted future traffic level.

In at least some implementations, a method for controlling a vehicle operating in a reduced power mode includes determining more than one route to a destination for the vehicle, comparing the energy required to reach the destination via each route against available energy output of the vehicle in the reduced power mode, and either: a) selecting a chosen route from the more than one routes as a function of a maximum differential between the energy required for the vehicle to travel along any portion of the route to the available energy output of the vehicle; or b) selecting a new destination when the energy required to reach the destination via each route is greater than the available energy output of the vehicle, where the new destination can be reached via a chosen route along which the energy required is not greater than the available energy output. The method may also include guiding the vehicle along the chosen route with a vehicle control system controlling the steering and speed of the vehicle.

In at least some implementations, the energy required to reach the destination via each route is determined as a function of a maximum speed limit along any portion of each route or as a function of a maximum torque required to operate the vehicle at a predetermined speed along any portion of each route. In at least some implementations, the predetermined speed is within 15% or 5 mph to 10 mph of a corresponding speed limit.

In at least some implementations, the energy required to reach the destination via each route is determined at a vehicle speed that is within 15% or 5 mph to 10 mph of the speed limits of roads in each route.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
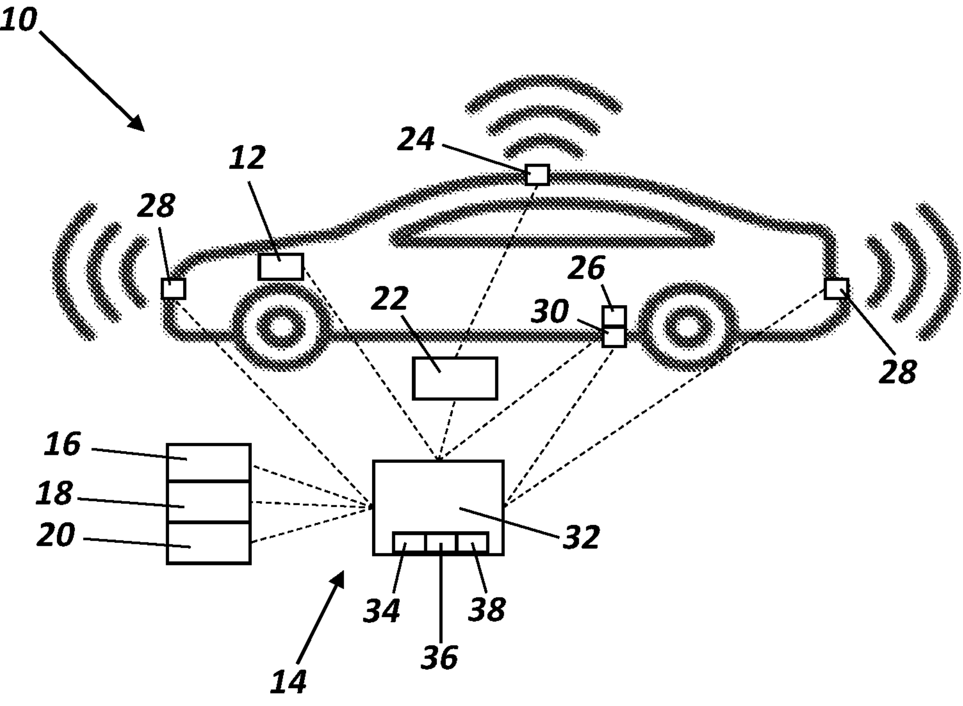
FIG. 1 is a schematic diagram of a vehicle control system.

Referring in more detail to the drawings, FIG. 1 illustrates a vehicle 10 having a prime mover 12 that provides motive power for the vehicle 10. The prime mover 12 may include a combustion engine, an electric motor or both, and is coupled to the vehicle wheels to propel the vehicle 10. The vehicle 10 has a control system 14 and multiple sensors that provide information to the control system 14 to enable desired operation of the vehicle 10. Vehicle operation includes control of a steering input 16, a throttle input 18 and a brake input 20, and may be accomplished with various levels of automation. In this way, the steering input 16, throttle input 18 and brake input 20 may be controlled by the control system 14 to achieve autonomous vehicle operation, at least for some part of the vehicle operation. Suitable steering, throttle and brake inputs may also be provided for a human driver to control the vehicle 10, such as a steering wheel and throttle and brake pedals.

In at least some implementations, the vehicle 10 is operable in an autonomous state in which the control system 14 manages each of the steering, throttle and brake inputs 16,18,20 without assistance from a human driver. This is done in conjunction with a navigation system 22 by which a destination for the vehicle 10 is chosen, and a route to the destination selected from one or more routed determined by the navigation system 22. The navigation system 22 includes a location sensor 24 (e.g. GPS device) that provide information about the vehicle's current location and a program including mapped roads and information about the roads such as regulatory information like speed limit and traffic signs/rules including permitted direction(s) of travel, locations of intersections, number of stops along a road or selected route, and terrain information like grades (e.g. inclines and declines), type of surface (e.g. paved or gravel/dirt), and sometimes current information including presence of construction, traffic level (current and/or predicted future traffic levels that may be encountered), lane closures, and the like.

Further, control of the vehicle 10 is accomplished with information provided by multiple sensors to the control system 14. For example, vehicle speed sensors 26 (e.g. speedometer and wheel speed sensors), object detection and proximity sensors 28 (e.g. cameras, lidar, radar and the like which may use light, radio, electromagnetic fields or ultrasonic emissions, for example), temperature sensors 30, and other sensors enable control of a vehicle 10 relative to road along which the vehicle 10 is traveling.

The control system 14 may be or include one or more vehicle electronic module(s) 32 installed in the vehicle 10. Each vehicle electronic module 32 may include some combination of or access to a data storage unit (e.g. memory) 34, an electronic control unit 36 which may include one or more controllers or processors, and programs or algorithms or instructions 38 stored in the data storage unit 34. Vehicle electronic module 32 may be a telematics control module (TCM), a body control module (BCM), an infotainment control module, or any other suitable module. It is not necessary for the preceding units to be packaged in a single vehicle electronic module, rather, they could be distributed among multiple vehicle electronic modules, they could be stand-alone units, they could be combined or integrated with other units or devices, or they could be provided according to some other configuration. The control system 14 is not limited to any particular architecture, infrastructure or combination of elements.

To facilitate control of the vehicle 10 and display of the information from the various sensors, the control system 14 includes at least one controller 32/36. In order to perform the functions and desired processing set forth herein, as well as the computations therefore, the controller 32/36 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 32/36 may include input signal processing and filtering to enable accurate sampling and conversion or acquisitions of such signals from communications interfaces and sensors.

As used herein the terms control system 14 or controller 32/36 may refer to one or more processing circuits such as an application specific integrated circuit (ASIC), an electronic circuit, a processor (shared, dedicated, or group) and memory 36 that executes one or more software or firmware programs, a combinational logic circuit, and/or other suitable components that provide the described functionality. Memory 36 can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory 36 can store an operating system that controls or allocates resources of a computing device, and can store instructions relating to the various functions and programs noted herein and otherwise.

In operation of the vehicle 10, various sensors and the like provide information and feedback to the control system 14 to permit intended control of the prime mover 12. For example, various sensors may provide information used in ignition and fuel injection controls for combustion engines, and torque/power output controls for electric motors. Different faults with the prime mover 12 and/or sensors used to control the prime mover 12 may occur in use of the vehicle 10. Some of these faults are not critical to operation of the vehicle 10/prime mover 12 and may relate to, for example, a reduction in redundancy of sensors or controls, for example where multiple sensors are used to provide certain information and one of the sensors malfunctions. In at least some instances or modes, the prime mover 12 does not need to be shutdown entirely, but can be and is operated in a reduced power mode wherein the prime mover 12 provides a lower power output that enables vehicle travel but not at full power. The level or magnitude of power reduction and resulting maximum power output of the prime mover 12 may vary depending, for example, on the type of fault and the likelihood that the fault could lead to unsafe vehicle operation or damage to the vehicle 10.

Figure 2:
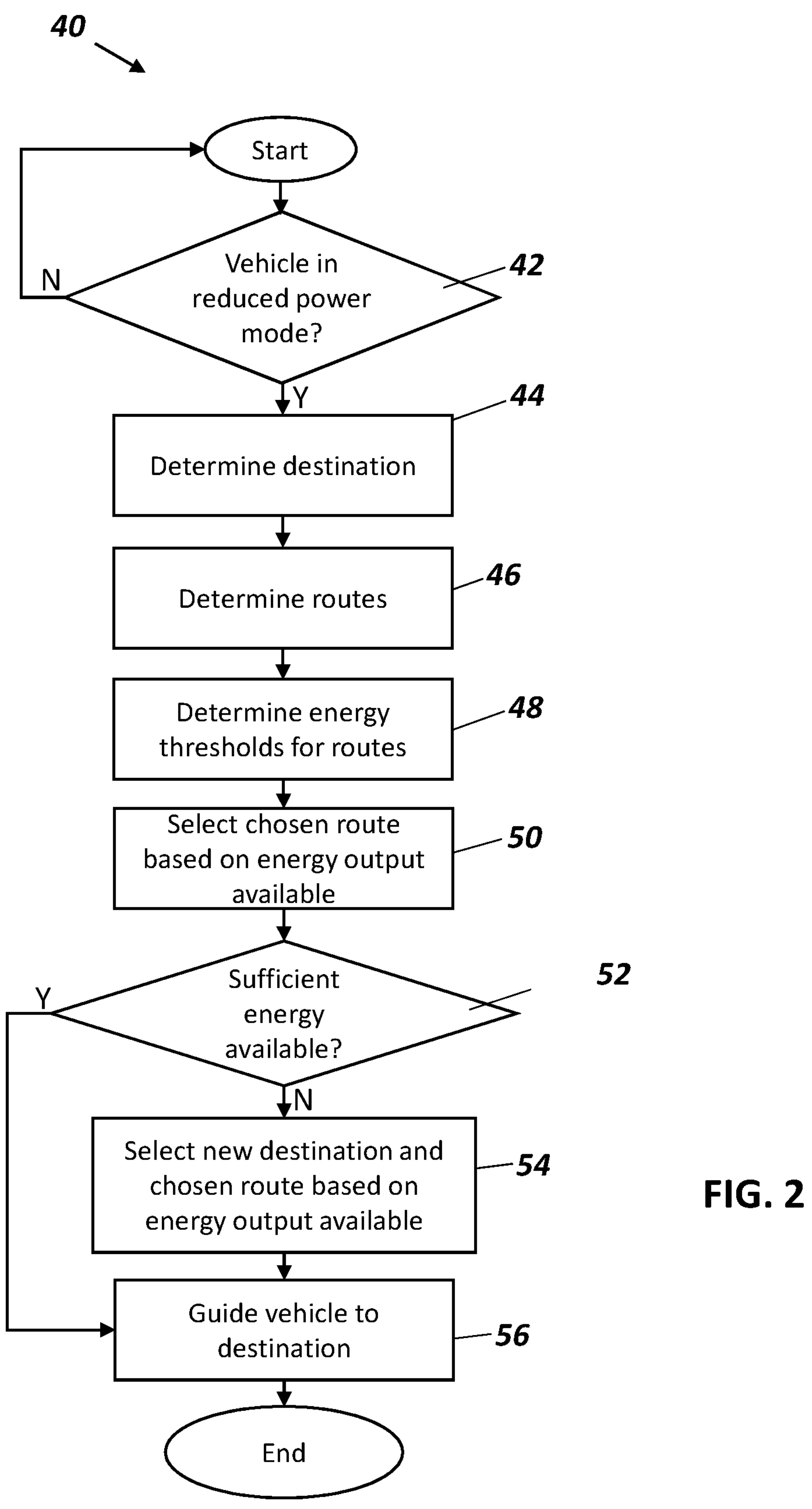
FIG. 2 is a flowchart of a method for determining a chosen route when a vehicle is operated in a reduced power mode.

FIG. 2 shows a method 40 for controlling a vehicle 10 in a reduced power mode. The method may start, or a check may be run in step 42 to determine if the vehicle 10 is in a reduced power mode. If the vehicle 10 is not in a reduced power mode, the method 40 may end or return to start. If the vehicle 10 is in a reduced power mode, then in step 44 a destination for the vehicle 10 can be determined or confirmed, if the destination is already set in the navigation program or system 22 of the vehicle 10.

While routes to the destination may have already been determined and a route selected, with the vehicle 10 now in reduced power mode, new routes to the destination may be determined and considered in steps 46 and 48. Here, the control system 14 may seek routes that are better suited for a vehicle 10 in reduced power mode which, for example, may have a reduced maximum speed and/or a reduced ability to travel up certain inclines.

Accordingly, each route provided by the navigation system 22 from the current location to the destination may be reviewed by the control system 14 with regard to the energy requirements needed for the vehicle 10 to safely travel that route. In this regard, the control system 14 may review route energy factors relevant to the vehicle energy needed along the route, or each part of the route (e.g. on each road along the route). Such route energy factors may include, but are not limited to, regulatory information, terrain information, and current information as noted herein.

The route energy factors may be compared to one or more thresholds set as a function of the current vehicle operation, including, for example, the reduced power available from the vehicle 10, and the total energy stored or available for use by the prime mover 12. For example, a maximum speed threshold may be set as a function of the highest speed the vehicle 10 can achieve in the reduced power mode. In at least some implementations, the maximum vehicle speed may be directly limited to a predetermined speed in the reduced power mode, or the maximum vehicle speed may be a function of the torque available from the prime mover 12 in the reduced power mode. The maximum speed threshold may be compared to the speed limit on different roads in the route. In at least some implementations, a route is not selected if a portion of the route includes a speed limit that is greater than the maximum speed threshold, or if the speed limit is more than 10% or 15% greater or more than 5 mph to 10 mph greater than the maximum speed threshold. Some roads include both a speed limit and a designated minimum speed for vehicle travel and in at least some implementations, a route is not selected if the minimum speed for a portion of the route is greater than the maximum speed threshold.

A maximum energy output threshold may be set as a function of the vehicle capabilities in the reduced power mode. The maximum energy output may relate to the maximum torque that can be provided by the prime mover 12. The maximum energy output threshold may be compared to the maximum energy required along the route. For example, in hilly or mountainous regions, the routes to a destination may require travel up grades of significant magnitude or length, and to achieve a certain vehicle speed requires a greater vehicle power output when traveling up an incline than when traveling along a flat road or a decline. The maximum energy required may then be a function of the energy output required from the vehicle 10 to travel at a threshold speed along a portion of the route that requires the greatest energy output from the vehicle 10 to maintain the threshold speed. In at least some implementations, the threshold speed may be set as a function of the speed limit for this portion of the route, for example, within 10% or 15% of the speed limit, or within 5 mph to 10 mph of the speed limit.

These and other route energy factors may be considered in selecting a chosen route, in step 50, along which to proceed, including for example, the type of road surface where greater energy may be required to travel along a dirt or gravel road than a paved road. After comparing the energy requirements for each route to the destination, the system selects a chosen route that satisfies all thresholds, or that represents a best choice among routes, where one or more thresholds are exceeded least and where thresholds may be ranked with regard to relative importance to the safe and efficient travel of the vehicle 10 and compared based on the ranking. In at least some implementations, a route may be chosen that does not satisfy all thresholds but where that route has the least maximum differential between a reduced maximum vehicle speed and a highest speed limit in each route, or the least maximum differential between a required torque for any part of the route and an available torque of the prime mover 12.

The chosen route may require a greater total distance of travel or a different type of travel (e.g. city driving with traffic and more stops as compared to highway driving) to, for example, avoid high speed roads or roads with significant grades. Accordingly, greater total energy may be needed for the vehicle 10 to travel along the new, chosen route. In view of this, the method may compare in step 52 the total energy required for the vehicle 10 to travel the route against the total energy available to the prime mover 12 to propel the vehicle 10. The total energy available is a function of the electrical charge remaining in the vehicle's batteries that is available to the electric motor(s) of the prime mover 12 and/or the fuel level remaining for a combustion engine. Many vehicles determine an average vehicle range based on the remaining energy available to the prime mover 12, and this range can be updated in view of the reduced power mode restrictions on the vehicle 10. To determine if the vehicle 10 has sufficient energy available to reach the destination, the expected energy use along the chose route can be compared to the total energy remaining for the prime mover 12 (or the calculated range).

If the total energy remaining is not sufficient for the vehicle 10 to complete the route, the vehicle 10 may choose an alternate destination, in step 54, which may be a charging or refueling station, or a vehicle service station at which the vehicle 10 can be repaired. The alternate destination could also be a safe spot to park the vehicle 10 and terminate vehicle operation if routes to a destination are not suitable in view of the energy requirements for those routes (e.g. if no route to the original destination satisfies the criteria for selection of a chosen route). So the system may find the best route to a safe spot from which, for example, a towing service can be summoned to take the vehicle 10 to a service station for repair.

When a route is chosen, and either sufficient energy is determined in step 52 to exist, or an alternate destination is selected in step 54, the vehicle 10 may then be guided in step 56 to the destination. In at least some implementations, this is done autonomously by the vehicle control system 14 which fully controls the vehicle 10, such that control of the vehicle 10, even in a reduced power mode does not need to be turned over to a human driver. In other implementations, a driver may be provided with guidance and instructions as to the new route in view of the vehicle operating in the reduced power mode. In either case, the control system 14 may provide information to the driver via the infotainment system to inform the driver of the change in route and/or change in destination, and to permit the driver to select a different route and/or a different destination, or otherwise control the vehicle 10 as desired.

What is claimed is:

1. A method, comprising:

determining that a vehicle is operating in a reduced power mode in which the vehicle is operated after detection of a fault in operation of the vehicle, and in the reduced power mode one or both of the maximum speed of the vehicle is limited or the maximum torque that can be provided from a prime mover of a vehicle is limited;

determining a destination of the vehicle;

determining more than one route to the destination;

determining one or more energy thresholds for each route;

selecting one of the routes as a chosen route based on the one or more energy thresholds and as a function of the energy output available from the vehicle; and guiding the vehicle along the chosen route with the vehicle being operated in the reduced power mode.

2. The method of claim 1 wherein the one or more energy thresholds is a maximum power required for the vehicle to navigate any portion of each route, and wherein any route that has a maximum power that is greater than the lower power output provided by the prime mover in the reduced power mode is not selected.

3. The method of claim 2 wherein the maximum power is determined as a function of at least: a) a road grade for a road within each route, and b) a speed limit of the road, and any route in which a predetermined speed cannot be maintained due to the road grade is not selected.

4. The method of claim 3 wherein the maximum power is determined at a level equal to or within 15% or 10 mph of the speed limit.

5. The method of claim 3 wherein the road has a minimum speed requirement and the maximum power is determined at a level equal to the minimum speed requirement.

6. The method of claim 1 wherein the one or more energy thresholds is a total energy required for the vehicle to travel each route, and the total energy is compared to a vehicle range that is determined as a function of the energy available to propel the vehicle with the vehicle being operated in the reduced power mode.

7. The method of claim 1 wherein guiding the vehicle is accomplished with a vehicle control system that controls steering, throttle and braking of the vehicle.

8. The method of claim 1 wherein the reduced power mode results in the vehicle having less available torque from a prime mover of the vehicle, and the step of selecting one of the routes is accomplished as a function of the available torque.

9. The method of claim 1 wherein the reduced power mode results in the vehicle having a reduced maximum speed, and the step of selecting one of the routes is accomplished as a function of the reduced maximum speed.

10. The method of claim 9 wherein the reduced maximum speed is compared to a speed limit of each road along each route, and the step of selecting one of the routes is accomplished as a function of the maximum differential between reduced maximum speed and a highest speed limit in each route.

11. The method of claim 1 wherein the chosen route is selected as a function of one or more of regulatory information, terrain information and current information.

12. The method of claim 11 wherein the regulatory information includes one or more of a road speed limit, traffic rules, permitted direction(s) of travel, locations of intersections, and number of stops along a road.

13. The method of claim 11 wherein the terrain information includes one or more of a road grade, and a type of road surface.

14. The method of claim 11 wherein the current information includes one or more of a presence of construction, a lane closure, a traffic level, where the traffic level may be one or both of a current or predicted future traffic level.

15. A method for controlling a vehicle operating in a reduced power mode, comprising:

determining multiple routes to a destination for the vehicle;

determining a minimum speed for each of multiple portions of each of the multiple routes, where the minimum speed is set as a function of a speed limit in each of the multiple portions;

comparing the minimum speeds required to reach the destination via each route against available power output from a prime mover of the vehicle while the vehicle is operated in the reduced power mode in which one or both of the maximum speed that the vehicle can achieve is limited compared to when the vehicle is not in the reduced power mode, or the maximum torque that can be provided from a prime mover of a vehicle is limited compared to when the vehicle is not in the reduced power mode; and either a) selecting a chosen route from the multiple routes as a function of the ability of the vehicle to achieve the minimum speeds required to reach the destination; or b) selecting a new destination when it is determined that the vehicle is not able to achieve the minimum speeds required to reach the destination along any of the multiple routes; and guiding the vehicle in the reduced power mode along the chosen route with a vehicle control system controlling the steering and speed of the vehicle.

16. The method of claim 15 wherein the ability of the vehicle to achieve the minimum speeds is determined as a function of a road grade for a road within each route.

17. The method of claim 16 wherein the minimum speed is within 15% or 10 mph of the speed limit in each of the multiple portions.

18. The method of claim 15 wherein the minimum speed required to reach the destination via each route is determined at a vehicle speed that is within 15% or 10 mph of the speed limits of roads in each route.

* * * * *